United States Patent
Van Thong et al.

(10) Patent No.: US 6,490,553 B2
(45) Date of Patent: Dec. 3, 2002

(54) APPARATUS AND METHOD FOR CONTROLLING RATE OF PLAYBACK OF AUDIO DATA

(75) Inventors: Jean-Manuel Van Thong, Arlington, MA (US); Davis Pan, Arlington, MA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/781,828

(22) Filed: Feb. 12, 2001

(65) Prior Publication Data

US 2002/0010916 A1 Jan. 24, 2002

Related U.S. Application Data

(63) Continuation of application No. 09/577,054, filed on May 22, 2000.

(51) Int. Cl.[7] .......................... G10L 21/04; G10L 15/04
(52) U.S. Cl. ..................... 704/211; 704/236; 704/267; 704/503
(58) Field of Search .................. 704/207, 210, 704/211, 215, 251, 254, 267, 268, 269, 500, 501, 503, 504, 236; 348/432.1, 468

(56) References Cited

U.S. PATENT DOCUMENTS

| | | | |
|---|---|---|---|
| 3,553,372 A | * 1/1971 | Wright et al. ............ 324/76.12 |
| 4,841,387 A | 6/1989 | Rindfuss | |
| 4,924,387 A | 5/1990 | Jeppesen | |
| 5,564,005 A | 10/1996 | Weber et al. | |
| 5,649,060 A | 7/1997 | Ellozy et al. | |
| RE35,658 E | * 11/1997 | Jeppesen ..................... 705/1 |
| 5,737,725 A | 4/1998 | Case ......................... 704/260 |
| 5,748,499 A | 5/1998 | Trueblood | |
| 5,793,948 A | 8/1998 | Asahi et al. | |
| 5,828,994 A | * 10/1998 | Covell et al. ............... 704/211 |
| 5,835,667 A | 11/1998 | Wactlar et al. ............... 386/96 |
| 6,023,675 A | 2/2000 | Bennett et al. ............. 704/235 |
| 6,076,059 A | 6/2000 | Glickman et al. ........... 704/260 |
| 6,161,087 A | * 12/2000 | Wightman et al. .......... 704/215 |
| 6,181,351 B1 | 1/2001 | Merrill et al. ............. 345/473 |
| 6,185,329 B1 | 2/2001 | Zhang et al. ............... 382/176 |
| 6,205,420 B1 | * 3/2001 | Takagi et al. ............... 704/200 |
| 6,260,011 B1 | 7/2001 | Heckerman et al. ........ 704/235 |
| 6,263,507 B1 | 7/2001 | Ahmad et al. .............. 725/134 |

OTHER PUBLICATIONS

Covell et al., "MACH1: Nonuniform Time–Scale Modification of Speech," 1998 IEEE International Conference on Acoustics, Speech and Signal Processing, May 1998, vol. 1, pp. 349 to 352.*

Hejna, D.J., Jr., "Real–Time Time–Scale Modification of Speech via the Synchronized Overlap–Add Algorithm," unpublished master's thesis, Massachusetts Institute of Technology (1990).

Hain, T., et al., "Segment Generation and Clustering in the HTK Broadcast News Transcription System," *Proc. DARPA Broadcast News Transcription and Understanding Workshop*, 1998.

Siegler, M.A. et al., "Automatic Segmentation Classification and Clustering of Broadcast News Audio," *Proc. DARPA Speech Recognition Workshop*, 1997.

(List continued on next page.)

Primary Examiner—David D. Knepper
Assistant Examiner—Martin Lerner
(74) Attorney, Agent, or Firm—Hamilton, Brook, Smith & Reynolds, P.C.

(57) ABSTRACT

The disclosed method and apparatus controls the rate of playback of audio data corresponding to a stream of speech. Using speech recognition, the rate of speech of the audio data is determined. The determined rate of speech is compared to a target rate. Based on the comparison, the playback rate is adjusted, i.e. increased or decreased, to match the target rate.

24 Claims, 6 Drawing Sheets

OTHER PUBLICATIONS

Siegler, M.A. et al., "On the Effects of Speech Rate in Large Vocabulary Speech Recognition Systems," *Proc. ICASSP*, May 1995.

Campbell, W.N., "Extracting Speech–Rate Values from a Real–Speech Database," *Proc. ICASSP*, Apr. 1988

Miller, G.A., et al., "The intelligibility of interrupted speech," *Journal of the Acoustic Society of America* 22(2) : 167–173, 1950.

David, E.E. et al., "Note on pitch–synchronous processing of speech," *Journal of the Acoustic Society of America*, 28(7):1261–1266, 1965.

Neuberg, E.E., "Simple pitch–dependent algorithm for high quality speech rate changing," *Journal of the Acoustic Society of America*, 63(2):624–625, 1978.

Roucos, S., et al., "High quality time–scale modification for speech," *Proc. of the International Conference on Acoustics, Speech and Signal Processing*, pp. 493–496, IEEE, 1985.

Malah, D., "Time–domain algorithms for harmonic bandwidth reduction and time scaling of speech signals," *IEEE Transactions on Acoustics, Speech, and Signal Processing, ASSP*–27(2):121–133, Apr. 1979.

Portnoff, M.R., "Time–scale modification of speech based on short–time Fourier analysis," *IEEE Transactions on Acoustics, Speech and Signal Processing, ASSP*–29(3):374–390, Jun. 1981.

Dolson, M., "The phase vocoder: A tutorial," *Computer Music Journal* 10(4):14–27, 1986.

Wold, E., et al., "Content–Based Classification, Search, and Retrieval of Audio," *IEEE Multimedia*, 3(3), 1996.

Miedema, H. et al., "TASI Quality—Effect of Speech Detectors and Interpolators," *The Bell System Technical Journal*, pp. 1455–1473 (1962).

Robert–Ribes, J., "On the use of automatic speech recognition for TV captioning," in *Proceedings, ICSLP*, 1998.

Robert–Ribes, J. and R.G. Mukhtar, "Automatic Generation of Hyperlinks between Audio and Transcript," in *Proceedings, EuroSpeech*, 1997.

Moreno, P.J. et al., "A Recursive Algorithm for the Forced Alignment of Very Long Audio Segments," in *Proceedings, ICSLP*, 1998.

(Table of Contents only).

(Table of Contents only).

Qureshi, S.U.H., "Speech Compression by Computer," in *Time–Compressed Speech*, S. Duker, ed., Scarecrow, 1974 (pp. 618–623).

Hauptmann, A.G. and M.J. Withrock, "Story Segmentation and Detection of Commercials in Broadcast News Video," *ADL–98 Advances in Digital Libraries Conference*, 12 pp. (Apr. 1998).

* cited by examiner

APPARATUS AND METHOD FOR
CONTROLLING RATE OF PLAYBACK OF
AUDIO DATA

RELATED APPLICATION(S)

This application is a continuation of application Ser. No. 09/577,054 filed May 22, 2000. The entire teachings of the above application are incorporated herein by reference.

Related subject matter to the below disclosure may be found in U.S. patent application Ser. No's. 09/353,729 filed Jul. 14, 1999 and Ser. No. 08/921,347 filed Aug. 29, 1997, now U.S. Pat. No. 6,076,059 issued Jun. 13, 2000.

BACKGROUND OF THE INVENTION

Many challenges exist in the efficient production of closed captions, or, more generally, time-aligned transcripts. Closed captions are the textual transcriptions of the audio track of a television program, and they are similar to subtitles for a movie show.

A closed caption (or CC) is typically a triplet of (sentence, time value and duration). The time value is used to decide when to display the closed caption on the screen, and the duration is used to determine when to remove it. Closed captions are either produced off-line or on-line. Off-line closed captions are edited and aligned precisely with respect to time by an operator in order to appear on the screen at the precise moment the words are spoken. On-line closed captions are generated live, during television newscasts for instance.

Captions can be displayed on the screen in different styles: pop on, roll-up or paint-on. Pop-on closed captions appear and disappear at once. Because they require precise timing, they are created post-production of the program. Roll-up closed captions scroll up within a window of three or four lines. This style is typically used for live broadcasts, like news. In that case, an operator who uses a stenotype keyboard enters the caption content live. The paint-on captions have a similar style to pop-on captions, except they are painted on top of the existing captions, one character at a time.

Captioning a video program is a costly and time-consuming process which costs approximately $1,000 per hour. That includes the whole service from transcription, time alignments and text editing to make the captions comfortable to read.

The number of closed-captioned programs increased dramatically in the United States because of new federal laws:

The landmark Americans with Disabilities Act (or ADA) of 1992 makes broadcasts accessible to the deaf and hard-of-hearing;

The FCC Order #97-279 requires that 95% of all new broadcast programs be closed captioned by 2006.

The TV Decoder Circuitry Act which imposes all televisions 13 inches or larger for sale in the United States to have a closed caption decoder built in.

In several other countries, legislation requires television programs to be captioned. On the other hand, digital video disks (DVD) have multi-lingual versions and often require subtitles in more than one language for the same movie. Because of the recent changes in legislation and new support for video, the demand for captioning and subtitling has increased tremendously.

The current systems used to produce closed captions are fairly primitive. They mostly focus on formatting the text into captions, synchronizing them with the video and encoding the final videotape. The text has to be transcribed first, or at best imported from an existing file. This is done in one of several ways: the typist can use a PC with a standard keyboard or stenotype keyboard such as those used by court reporters. At this point of the process, the timing information has been lost and must be rebuilt. Then the closed captions are made from the transcription by splitting the text manually in a word processor. This segmentation can be based on the punctuation, or is determined by the operator. At that point, breaks do not make any assumption on how the text has been spoken unless the operator listens to the tape while proceeding. The closed captions are then positioned on the screen and their style (italics, colors, uppercase, etc.) is defined. They may appear at different locations depending on what is already on the screen. Then the captions are synchronized with the audio. The operator plays the video and hits a key as soon as the first word of the caption has been spoken. At last, the captions are encoded on the videotape using a caption encoder.

In summary, the current industry systems work as follows:

Import transcription from word processor or use built-in word processor to input text;

Break lines manually to delimit closed captions;

Position captions on screen and define their style,

Time mark the closed captions manually while the audio track is playing;

Generate the final captioned videotape.

Thus, improvements are desired.

SUMMARY OF THE INVENTION

The parent invention provides an efficient system for producing off-line closed captions (i.e., time-aligned transcriptions of a source audio track). Generally, that process includes:

1. classifying the audio and selecting spoken parts only, generating non-spoken captions if required;
2. transcribing the spoken parts of the audio track by using an audio rate control method;
3. adding time marks to the transcription text using time of event keystrokes;
4. re-aligning precisely the transcription on the original audio track; and
5. segmenting transcription text into closed captions.

The present invention is directed to the audio rate control method of step 2, and in particular provides a method and apparatus for controlling rate of playback of audio data. Preferably using speech recognition, the rate of speech of the audio data is determined. The determined rate of speech is compared to a target rate. Based on the comparison, the playback rate is adjusted, i.e. increased or decreased, to match the target rate.

The target rate may be predefined or indicative of rate of transcription by a transcriber.

The playback rate is adjusted in a manner free of changing pitch of the corresponding speech.

Time domain or frequency domain techniques may be employed to effect adjustment of the playback rate. The time domain techniques may include interval sampling and/or silence removal.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
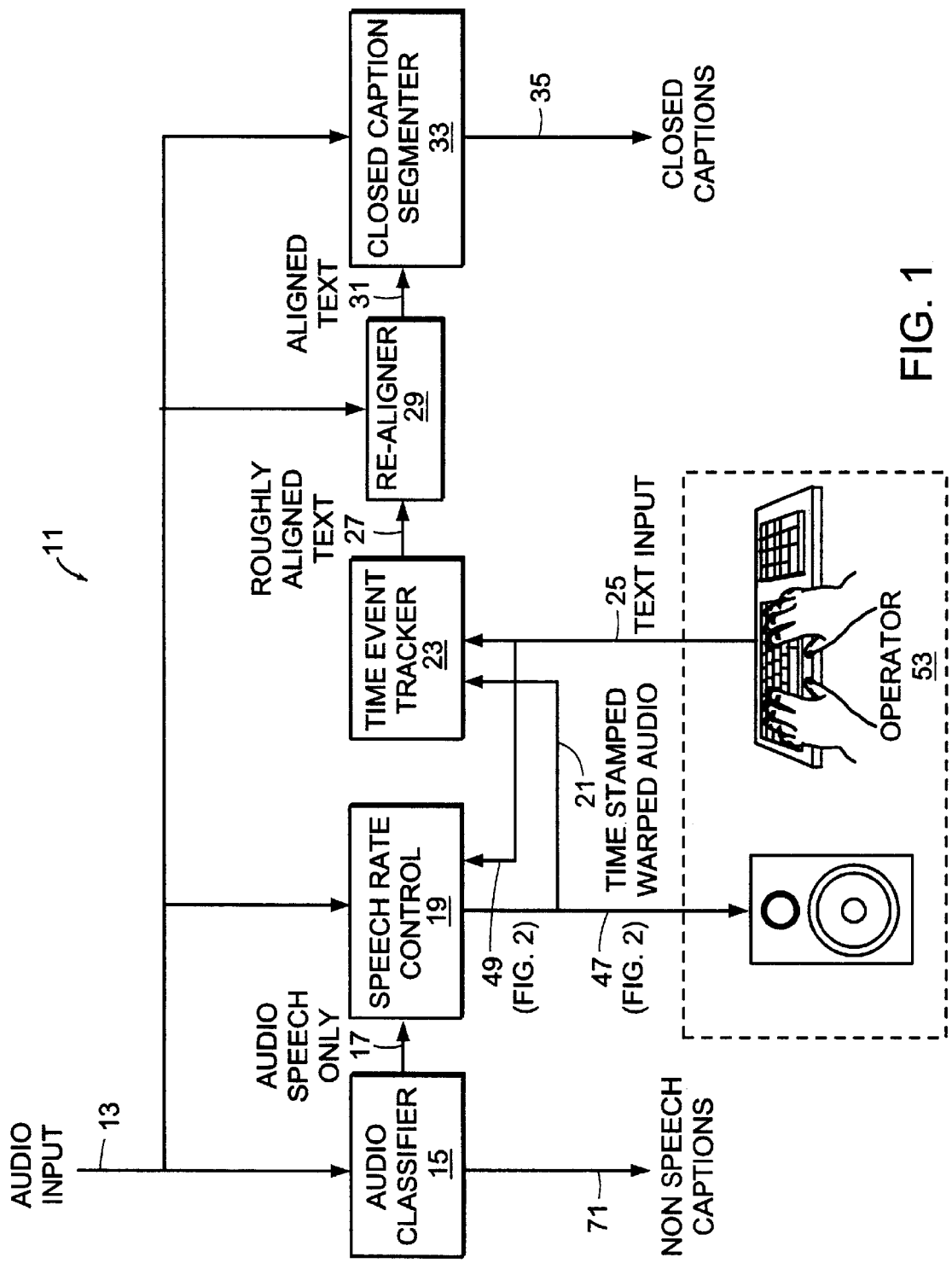
FIG. 1 is an overview block diagram of the present invention.

The present invention provides a semi-automatic method for producing closed captions or more generally time-aligned transcriptions from an audio track. In a preferred embodiment as illustrated in FIG. 1, the invention system 11/method is a five-step process and requires an operator to transcribe the audio being played. The system 11 helps the operator to work efficiently and automates some of the tasks, like segmentation of the captions and their alignment along time. A brief instruction of each step (also referred to herein as a software "module") as illustrated in FIG. 1 is presented next, followed by a detailed description of each in the preferred embodiment. It is understood that these steps/modules are performed by a digital processor in a computer system having appropriate working memory, cache storage and the like as made apparent by the functional details below.

A first module, the audio classifier 15, sorts the input audio 13 into different categories: spoken text, music, etc. Of interest are in the spoken parts of the input audio 13 track because the spoken parts need to be transcribed. Possibly, a particular noise or sound other than spoken language may need to be captioned. However, only the spoken parts 17 as sorted or filtered by the audio classifier 15 are sent to the next module 19.

The next module, the speech rate-control module 19, controls the rate of speech depending on how fast the text is spoken and/or how fast the operator 53 types. This module ensures that the spoken text remains understandable by maintaining a constant pitch. The audio produced 21 is time-stamped since a time dependent transformation has been applied to the audio samples. The time stamps allows the next module 23 to use the proper time scale. The speech-rate control module 19 preferably uses speech recognition techniques at the phoneme level.

The third module, the time event tracker 23 receives the time-stamped audio 21 and records the time the words were typed in by the operator 53. This provides a rough time alignment of the corresponding text 25 that will be precisely realigned by the next module 29. The recorded time events are mapped back to the original time scale. Thus the time event tracker 23 produces on output roughly aligned transcription text 27.

The fourth module 29 receives the roughly aligned text 27 and realigns precisely the text on the audio track 13 using speech recognition techniques at the word level. Realigner 29 thus outputs aligned transcribed text 31.

Finally, the closed caption segmenter 33 breaks the aligned transcribed text 31 into captions, similar to a sentence for written text, based on acoustic and other clues. To that end, closed caption segmenter 33 produces the desired closed captions 35.

Turning now to the particular details of each of the above modules as implemented in a preferred embodiment, reference is made to FIGS. 2–4 in the discussion below.

Audio Classifier Module 15

Before playing the audio input 13 to the operator 53, the audio classifier 15 segments or otherwise sorts the audio input 13 into working parts that contain spoken words. The audio classifier 15 also identifies parts that contain other sounds of interest (like a barking dog, music inserts or a train passing by) for the purposes of non-speech closed captioning 71. Thus audio classifier 15 determines and separates the audio portions containing spoken words and the audio portions containing non-speech sounds needing transcribing. Closed captions for the latter are produced at 71 while closed captions for the spoken works/speech audio are produced by the rest of system 11. In summary, module 15 enables the operator 53 to concentrate only on the spoken word parts that need to be transcribed.

This approach is known in the literature as "audio classification". Numerous techniques may be used. For instance, a HMM (Hidden Markov Model) or neural net system may be trained to recognize broad classes of audio including silence, music, particular sounds, and spoken words. The output audio speech 17 is a sequence of segments, where each segment is a piece of the source audio track 13 labeled with the class it belongs to. An example of a speech segmentation system is given in "Segment Generation and Clustering in the HTK Broadcast News Transcription System," by T. Hain et al., *Proc. DARPA Broadcast News Transcription and Understanding Workshop*, 1998. Other audio classifier systems are suitable.

Note that this module 15 can eventually be integrated with the speech rate control module 19 since the speech rate control module 19 already performs phoneme recognition. In that case, additional sound or general filler models can be added to the phoneme models in order to capture non-speech audio.

Speech Rate Control Module 19

This module 19 controls the speech playback rate based on a count of speech units while playing back a recording (i.e., the filtered audio speech 17 output from audio classifier 15). Speech units are typically phonemes. The speech rate control module 19 allows adjusting automatically the rate of spoken words from the audio 17 to a comfortable rate for the listener (transcriber operator 53). With reference to FIG. 2, speech recognizer 41 analyzes the audio speech 17 which is a recorded speech stream and produces a count of speech units for a given unit of time. A calculation unit of the recognizer 41 averages or windows this data over a larger unit of time to smooth the results and gives an estimate 39 of the speech rate. A speech-playback-rate adjustment unit 43 uses the computed speech rate estimate 39 to control the playback rate of subject audio speech 17. Speech-playback-rate adjustment unit 43 controls the playback rate to match a desired target rate 37 as output/determined by target rate calculation unit 45. The desired target speech rate 37 may be a predefined value or depend on an external synchronization, here the keyboard input (i.e., real time transcribed text) 49.

As a result, speech rate control module 19 outputs rate-adjusted speech audio 47 at a desired rate for the transcriber operator 53 to listen to. In addition, the speech rate control module 19 produces a time-stamped audio 21 transformation of audio speech 17.

One embodiment of the speech rate control module 19 is described in detail in Appendix I.

Time Event Tracker Module 23

This module 23 automatically links operator text (transcription) input 25 with the time-stamped audio stream 21 output from speech rate control 19. This linking results in a rough alignment 27 between the transcript text and the original audio 13 or video recording.

Preferably the module 23 tracks what the transcriber operator 53 has typed/input 25 and how fast the transcriber 53 is typing. The module 23 automatically detects pre-defined trigger events (i.e., first letter after a space), time stamps these events and records time-stamped indices to the trigger events in a master file in chronological order. Operator text input 25 is thus linked to the speech rate control module 19 time-stamped audio output stream 21 by the nearest-in-time trigger event recorded for the audio stream 21 data.

Effectively the time event tracker module 23 controls speech rate as a function of typing speed. Further details of one embodiment of event tracker 23 is found in Appendix II.

Realigner Module 29

Figure 3:
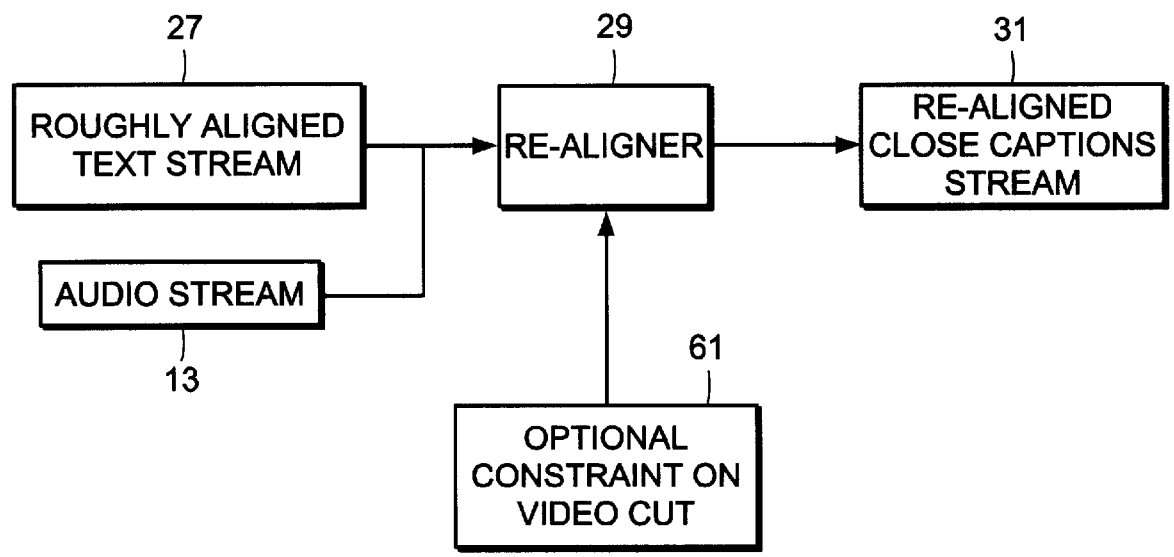
FIG. 3 is a block diagram of the realigner of the embodiment of FIG. 1.

Referring to FIG. 3, the realigner module 29 realigns words from the rough-aligned text stream 27 (output from the Time Event Tracker Module 23) in order to improve quality of the time marks generated by the Time Event Tracker 23. Since captions appear on the screen as a group of words determined by the segmenter module 33, the realigner module 29 is only interested in aligning precisely the first and last word of each caption (group of words per screen). The time indication associated with the first word determines when the caption should appear, and the time mark of the last word determines when the caption should disappear (be removed) from the screen.

The realigner 29 uses a combination of speech recognition and dynamic programming techniques and receives as input the original audio track 13 and the roughly aligned text 27 (from Time Event Tracker 23). The output 31 is a new sequence of caption text with improved time alignments. Although time aligned, the stream of output text 31 has no sentence formatting or punctuation (i.e., no capital first letters of a sentence, etc.) Restated, the operator transcriber 53 may disregard punctuation and capitalization. As such the transcribing task is made simpler and the operator can accomplish the keyboarding of text from the rate adjusted audio 47 more quickly (in a shorter amount of time). The resulting output text 31 is thus a sequence of characters with time stamps indicating time occurrence relative to the time scale of the original audio 13. Additional constraints 61, like video cut time marks or additional delay may be added to improve readability of the output text 31.

A realigner 29 of the preferred embodiment is described in U.S. patent application Ser. No. 09/353,729 filed Jul. 14, 1999 by Assignee of the present invention, entitled "Method for Refining Time Alignments of Closed Captions" and herein incorporated by reference.

Closed Caption Segmenter Module 33

Figure 4A:
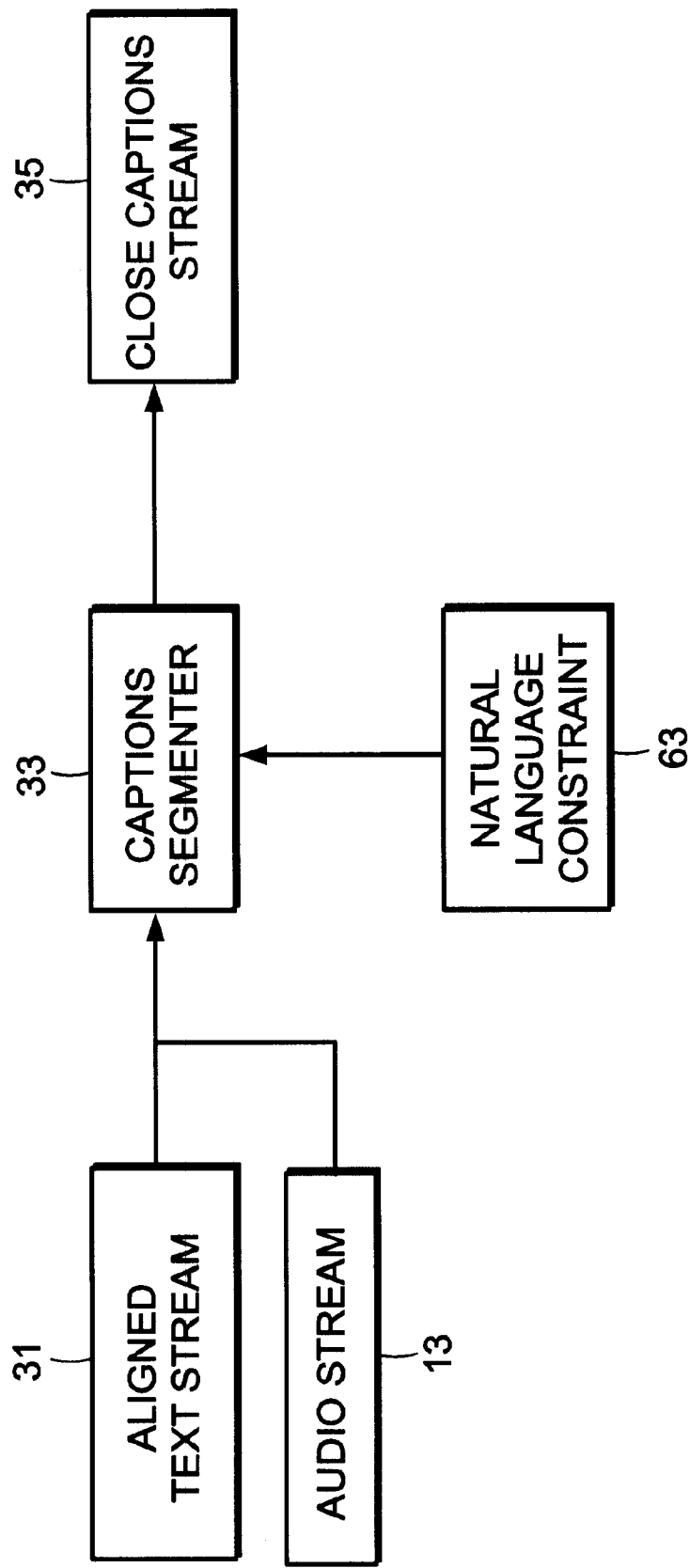
FIG. 4A is a block diagram of the closed caption segmenter of the embodiment of FIG. 1.
Figure 4B:
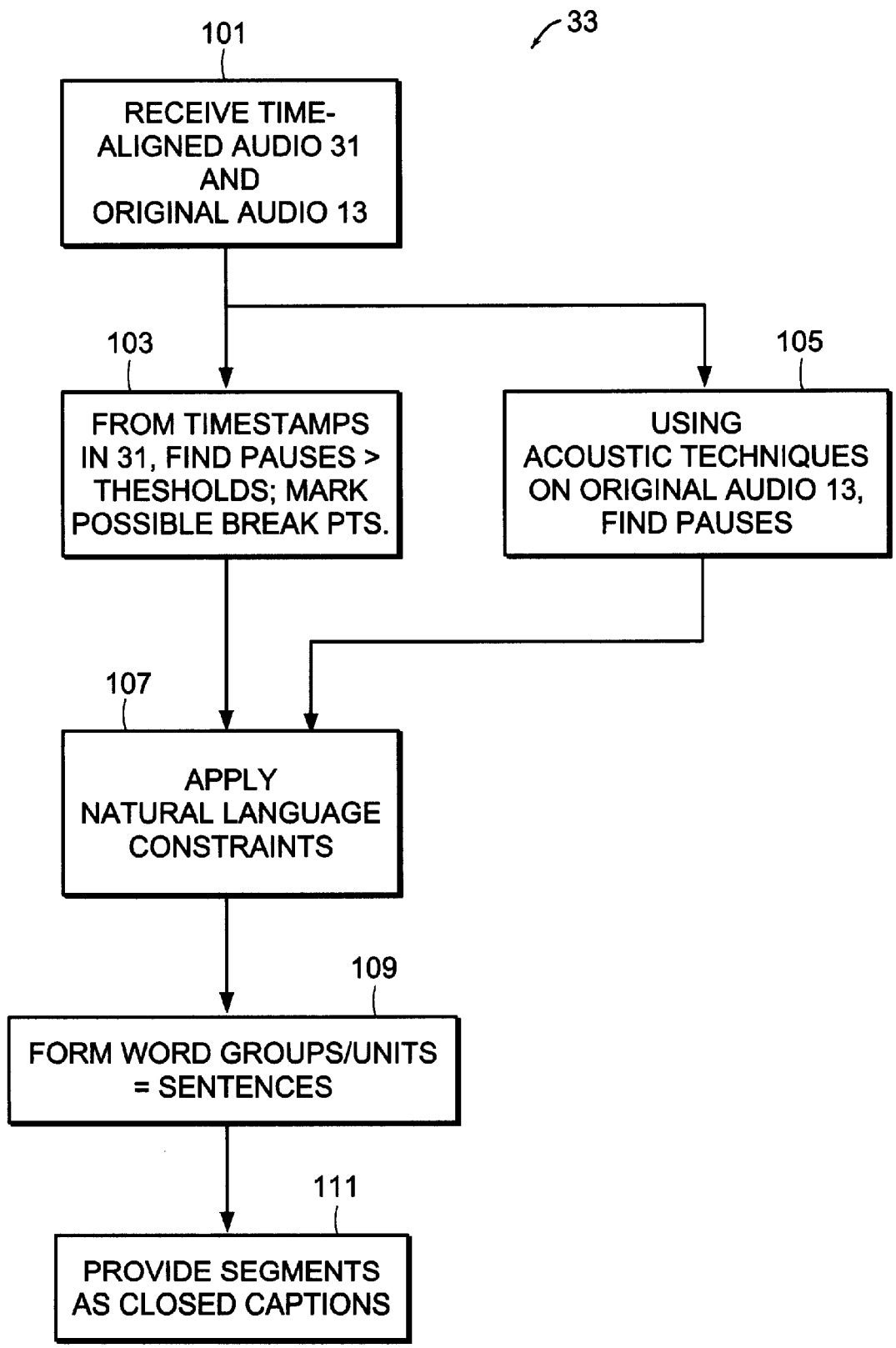
FIG. 4B is a flow diagram of the segmenter of FIG. 4A.

The closed caption segmenter module 33 receives as input the stream 31 of aligned text and the original audio track 13, and finds appropriate break points (silence, breathing, etc.) to segment the text into desired closed captions. Thus the segmenter 33 effectively automates the restructuring and reformatting of the transcription text into sentences or phrases appropriate for captioning. The segmenter module 33 preferably uses three criteria to find these break points: length of inter-word boundaries; changes in acoustic conditions and natural language constraints. FIGS. 4A and 4B are illustrative as described below.

With reference to FIG. 4A, the output 31 of the realigner module 29 (FIG. 3) is time-stamped text. This timing information is useful to the segmentation process since the length of pauses between words gives an indication of where sentence breaks might be. However, the alignment process is not perfect nor are inter-word pauses necessarily consistent between speakers. Thus the segmenter 33 additionally uses acoustic and other clues.

Some examples of segmentation schemes based solely on acoustic information exist in the speech recognition literature. For example, "Automatic Segmentation, Classification and Clustering of Broadcast News Audio" by M. A. Siegler et al., *Proceedings DARPA Speech Recognition Workshop*, 1997, describes a segmenter which uses changes in the probability distribution over successive windows of sound combined with energy thresholds to generate segment breaks. The combination of this or a similar scheme with the inter-word pause information lends robustness to the segmentation process of the present invention.

Additionally, the segmenter 33 uses natural language constraints 63 to verify possible segmentation points. For example, a segment break is unlikely to occur after a "the" or "a" in a subset of words. This final piece of information further increases robustness of the overall system 11.

With reference to FIG. 4B, one embodiment of the segmenter 33 operates as follows.

At a beginning step 101, segmenter 33 receives time aligned audio 31 and original audio 13. Recall that time aligned audio 31 includes only speech to be transcribed. At step 103 segmenter 33 analyzes time aligned audio 31 and in particular reads time stamps from one word to another in time aligned audio 31. The difference between the time stamp at the end of one word and the time stamp at the beginning of an immediately following word is the amount of time between the two words. That is, that difference measures the length of time of the pause between the two words. If the pause is greater than a predefined suitable threshold (e.g., one second), then segmenter 33 indicates or otherwise records this pair of words as defining a possible break point (between the two words) for captioning purposes.

From the original audio 13, segmenter 33 detects pauses acoustically at step 105. Where low energy and sound levels span a longer period of time than any syllable in a neighboring word, step 105 defines a pause of interest. In particular, segmenter 33 defines such pauses as the end of a sentence.

Of the detected pauses from steps 103 and 105, segmenter 33 may find common pauses (at the same time marks). These have a greater possibility, than the other detected pauses, of indicating the end of a sentence. To further verify validity of this assumption (that the pause is at the end of a sentence), segmenter 33 applies (at step 107) natural language rules to the words surrounding the pause. If the preceding word is an article such as "a" or "the", then the pause is not at the end of a sentence (because English sentences do not end with an article). Other natural language rules are described in, e.g., in *Analyzing English Grammar* by T. P. Klammer et al., Allyn & Bacon, ed. 1999, herein incorporated by reference.

Step 107 having defined the end of sentences (from the pauses of steps 103 and 105), segmenter 33 forms groups or units of words between such pauses/ends of sentences. These word groupings are effectively sentences and step 109 thus provides punctuation, capitalization and other sentence formatting and visual structuring.

The last step 111, provides the formed sentences in segments appropriate for closed captions according to the time stamps of time aligned audio 31 and the corresponding time marks of the playback of original audio 13. That is, as the audio 13 is being played back, the first word made audible in a given section is the first word of the closed caption text to be displayed and the last word followed by a pause in the given audio section should be the last word of the closed caption text. Step 111 processes each of the formed sentences in this manner to provide segments appropriate for closed captions. As a result, closed captions 35 are output from segmenter 33.

According to the foregoing discussion of the present invention, a semi-automatic system that assists the transcriber in his task is provided. The invention system helps the transcriber to work efficiently and automates some of the tasks, like segmentation of the captions and their precise alignment along time.

The invention system and method is efficient for at least the following reasons:

1. The system is efficient and comfortable to use; the operator doesn't have to pause and rewind the recording if it is playing too fast because the system self controls the rate of speech playback.
2. The operator can focus on the part of the video/audio track that really has to be transcribed (spoken words).
3. The manual alignment of closed captions along time is eliminated by the system (a) capturing time information while the operator types in the transcription, and (b) realigning captions as a post-process.
4. Caption segmentation is performed at relevant points in time.

In another example, a speech recognition system may be combined with the present invention as follows. The input audio track may be transcribed (at least in part) by a speech-to-text speech recognition engine. For the portions of the audio track that the speech recognition engine does not transcribe well or cannot transcribe, the present invention is utilized. That is, the input to the present invention system is formed of the above-noted portions of audio (that the speech recognition engine does not transcribe) and the operator would focus just on those portions. The closed captions/text resulting from the invention system are then used to refine the acoustic models and dictionary of the speech recognition system. A confidence measure is utilized in determining which portions of the audio track the speech recognition engine does not transcribe well.

Accordingly, the present invention creates timing information on transcription of a given audio track for use in closed captioning, subtitling and indexing of digitally stored audio files. In the case of indexing, the given digital audio file may be treated as a document whose content exists as a stream of audio. Each word of the document is time marked to indicate the location of the word in the audio stream or video frame where the document is a video recording. A useful index to the document (corresponding audio stream) cross references each word of the document by speaker, time mark and/or relative location in a language structure such as sentence or music clip, etc. With such an index, a search engine is able to search audio files by speaker, particular word and/or particular sentence (or other language structure). In a preferred embodiment, the search engine retrieves an audio clip matching the query parameters and displays the results. To accomplish this, the retrieved audio stream is downloaded and processed by a speech recognition module which produces text from the input audio stream. Where the speech recognition module employs the present invention techniques of transcribing audio, the resulting display is formed of correctly punctuated sentences. Without the present invention transcription method and apparatus, a speech recognition module would produce text without punctuation.

In the preferred embodiment, the end user is thus presented with a visual display of text that corresponds to the retrieved audio. Upon playback of the audio (in response to the user selecting or otherwise issuing a "play" command), the sound system of the user's computer produces the subject audio track while the screen displays the produced transcription text in synchronization with the audio. In a preferred embodiment, the audio that is downloaded and processed by the speech recognition module is deleted after the transcription process. A pointer to the server where the audio is stored is embedded in the displayed results. The embedded pointer is coupled to the "play" command to effect retrieval and rendering of the audio upon user command.

These and other uses of the invention exist and are now in the purview of one killed in the art having this disclosure before him.

While this invention has been particularly shown and described with references to preferred embodiments thereof, it will be understood by those skilled in the art that various changes in form and details may be made therein without departing from the scope of the invention encompassed by the appended claims.

For example, captioning/subtitling systems may also be used wherever time-aligned transcripts are required. Such transcripts are useful for multimedia indexing and retrieval similar to that discussed above. They can be used to permit the user to precisely locate the parts of the video that are of interest. Emerging application domains include customized news-on-demand, distance learning, and indexing legal depositions for assisting case preparation. Users may access such indexed video and audio via the Internet, using streaming technologies such as RealVideo and RealAudio from RealNetworks.

Aligned transcripts may be used to index video material stored on a digital VCR, either delivered as closed captions integrated into the signal, or delivered separately via an Internet connection.

Recently, a synchronized multimedia standard has been developed by the W3C, called SMIL. Among other aspects, it allows streaming Internet video to be closed-captioned. The SMIL standard is supported by the RealNetworks G2 format. Users can choose whether or not to view the captions or by selecting an option on the RealPlayer. So in the future, creating multimedia for the World Wide Web may typically involve creating captions, as is currently done for TV.

Finally, the rate-control portion of the invention system described here would be of value whenever transcripts are required, whether or not the alignment information is needed.

APPENDIX I

A Speech Rate Control Method Using Speech Recognition

The following is a method, device and system for controlling the rate of speech while playing back a recording. Recorded speech can be difficult to follow or to understand when the speech is too fast or too slow. For instance, when transcribing an audio track, an operator may have to often pause, rewind, or fast-forward the tape to catch all the words he/she has to type in. These operations are tedious and time consuming.

The method described here allows automatic adjustment of the rate of spoken words to a comfortable rate for the listener. Used herein is a speech recognizer to parse the incoming speech, and the rate of the recognized speech units is used to alter the speech-playback rate. The playback rate maybe adjusted to a constant target rate or depend on an external synchronization.

Abstract

The disclosed is a method to control the speech-playback rate based on a count of speech units. A speech recognizer analyzes a recorded speech stream and produces a count of speech units for a given unit of time. This data, averaged or windowed over a larger unit of time to smooth the results, gives an estimate of the speech rate. A Speech-Playback Rate Adjustment Unit uses the computed speech rate to control the speech-playback rate to match a desired rate. The desired speech rate can be a predefined value or can be controlled by another measured value such as the rate transcript text is entered by a typist listening to the speech playback.

Purpose

The disclosed is a method, device and system to automatically adjust the playback rate of recorded speech to match a target rate. The target rate may either be a pre-selected value or may be computed to synchronize the playback rate to match an external source such as a text transcription rate.

Background Matter

This subject matter was first discussed by Assignee while working on multimedia indexing. One way of indexing multimedia documents is to use the transcription of the spoken content. For long documents, one would also have to align the text on the audio track in order to be able to go from the indexed text to the corresponding piece of audio. Closed captions, if they exist, give one that information. Recently AltaVista partnered with Virage and Compaq Cambridge Research Lab to build such a system. While talking with AltaVista, it was clear that one needed to find solutions to produce closed captions efficiently when such captions do not exist.

The first solution that came to mind would be to use speech recognition to generate the time aligned transcription. Assignee is are currently running experiments to see how good it would be for indexing. In many cases, one would still need an exact transcription and even the best speech recognizers are not accurate enough for that task, especially when the acoustic conditions vary widely. AltaVista looked at having the closed captions produced by a third party: The cost is approximately $1,000 per hour. Considering that this industry is still in its infancy and the methods used are fairly primitive, Assignee started to look for semi-automatic solutions for producing closed captions or more generally time aligned transcriptions from an audio track.

Another approach is to design a system that would help the transcriber in his task. The foregoing disclosure proposes a semi-automatic system for producing closed captions. The system helps the operator to work efficiently and automates some of the tasks, like segmentation of the captions, and their precise alignment along time. FIG. 1 shows the different modules of such a system, as described previously.

By way of review, the first module, the audio classifier, sorts out the input audio into different categories: spoken text, music, etc. Interest here lies in the spoken parts because they need to be transcribed, but also possibly in particular noises or sounds that may need to be noted in the captions. Only the spoken parts are sent to the next module.

The next module, the speech rate-control module, controls the rate of speech depending on how fast the text is spoken and/or how fast the operator types. This module ensures that the spoken text remains understandable by maintaining a constant pitch. The audio produced is time-stamped since a time dependent transformation has been applied to the audio samples. Time stamps will allow the next module to use the proper time scale. The following discussion improves the functionality of this module. Current dictation and close captioning systems cannot alter the rate of speech playback. If the speech rate is faster than the rate the transcriber can type, then he will have to frequently pause the playback in order to catch up with the speech. If the speech rate is slower than the transcriber's typing rate, there is no mechanism to make the speech playback faster. The following discussion describes a method of adjusting the rate of speech playback automatically through the use of speech recognition techniques.

The third module, the time event tracker, records the time the words were typed in by the operator. This provides a rough time alignment that will be precisely re-aligned by the next module. The recorded time events are mapped back to the original time scale.

The fourth module re-aligns precisely the text on the audio track by using speech recognition techniques at the word level.

Finally, the closed caption segmenter breaks the text into captions, similar to a sentence for written text, based on acoustic clues.

The How's

Figure 2:
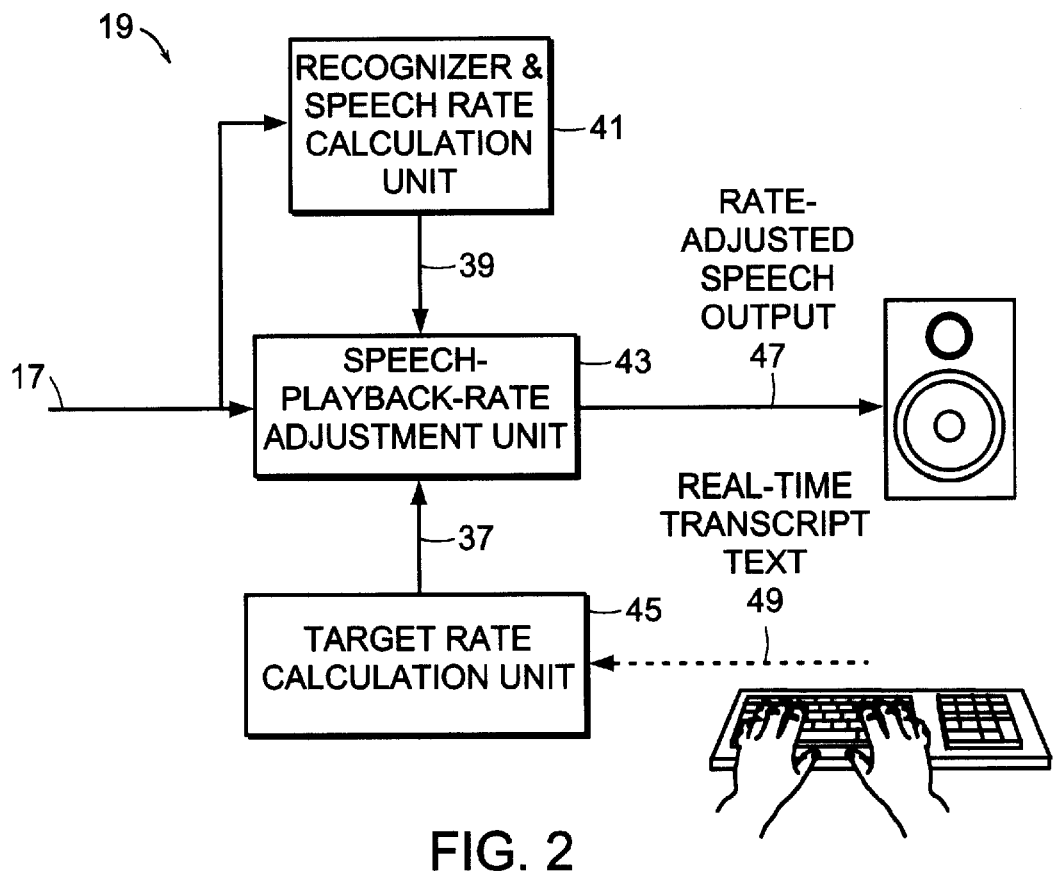
FIG. 2 is a schematic illustration of the speech rate control module of the embodiment of FIG. 1.

FIG. 2 shows a block diagram of the Speech Rate Calculation Unit. The Speech Rate Calculation Unit analyzes the recorded speech data and calculates the average speech rate. This unit may operate in real time, or the averaged instantaneous rate values may be computed ahead of time during a preprocessing step. The Target Speech Rate Calculation Unit either provides a predetermined value or computes the target rate based on a computation based on an external source, for example by the transcriber's text entry rate. The Speech-Playback Rate adjustment unit compares the speech rate of the recorded speech with the target rate. If the difference in rates exceeds a predefined threshold, then the unit speeds up or slows down the playback of the speech output to reduce the difference in rates.

Speech Rate Calculation Unit 41

The speech rate calculation unit 41 uses a speech recognition system to compute the rate of speech (ROS). The speech recognition system analyzes the incoming audio and produces the most likely sequence of linguistic units that matches what has been said. Linguistic units could be sentences, words or phonemes. Phonemes represent the smallest possible linguistic units. The speech recognition system outputs sequences of these linguistic units together with their time alignments, i.e., when they occur along the stream of speech.

The recognition system may operate in one of two different modes, batch or streaming. In batch mode, recognized linguistic units are returned once a whole chunk of audio has been processed. For instance, a batch recognition system can compute and return the best hypothesis for each linguistic unit once every few seconds. This approach allows running several passes on data and can therefore increase recognition accuracy. In the streaming mode, linguistic units are returned as soon as they are recognized. This approach allows running real-time applications like dictation. A method to implement a streaming version of a phonetic recognizer with low latency is described in U.S. application Ser. No. 08/977,962 filed Nov. 25, 1997 by Jean-Manuel Van Thong and Oren Glickman and entitled "Real Time Method for Streaming Phonemes During Speech Decoding" and herein incorporated by reference. A low-latency streaming phoneme recognizer allows the system to start playback with a short delay and without preprocessing. A batch system could be used, but the user would have to preprocess the speech data, or wait until at least a chunk of audio is processed before starting playback.

The sequence of phonemes generated by the recognition system can be used to compute the rate of speech. The rate of speech varies globally between speakers, and locally for the same speaker, due to emotion, stress, emphasis, etc. "On the Effects of Speech Rate in Large Vocabulary Speech Recognition Systems" by Matthew Siegler and Richard Stem, in *Proceedings, ICASSP*, May 1995, shows that phoneme recognition can be used to give a good measure of rate of speech.

In the preferred embodiment of the Speech Rate Calculation Unit 41, phoneme recognition is used instead of word or sentence recognition for several reasons. First, small linguistic units give a better measure of the rate of speech because there is a much higher variation in the structure and length of words. See "Extracting Speech-Rate Values from a Real-Speech Database", by W. N. Campbell in *Proceedings, ICASSP*, April 1988. Also, the phonetic rate is somewhat independent of the word length, and thus the number of short words versus long words will not have a major impact on the measure of speech rate. Second, the size of the input dictionary is limited to the number of phonemes, typically between 40 and 50 depending on the implementation, and therefore the system is inherently less complex than systems employing a larger linguistic unit. With phoneme recognition, a real-time, streaming system is possible, without a need for a preprocessing step. Third, using phonemes allows faster reactions to variations in speech rate. Last, using phoneme recognition makes the system almost language independent. Most of European languages use roughly the same phoneme set.

The phoneme recognizer can readily detect pauses between words and long silences or other non-speech interludes. The system can thus be optionally set to automatically skip or speed playback over long pauses or sections of non-speech audio such as music. To prevent the computed speech rate from dropping during periods of non-speech playback (because no phonemes are present), these periods should not be factored into the speech rate calculations.

The measured rate of speech can be averaged in order to smooth the local variations of ROS. The average phonetic rate can be computed in several ways. For example, one can count the number of phonemes within a time window of a few seconds. The time window is a FIFO (First In, First Out) queue of phonemes and corresponds to a fixed interval of time. Recognized phonemes are time marked with their start and end time, usually measured in number of audio samples, so one knows the relative position of phonemes within a given time window. The number of phonemes within the window, divided by the length of the time window, gives the phonetic rate.

Target Rate Calculation Unit 45

The target rate can be set to a pre-defined value or may depend upon an external synchronization source.

If the output speech rate is set to a constant value, the Speech-Playback Rate Adjustment Unit generates speech output with a phonetic rate that matches that value on average.

Alternatively, the speech-playback rate may depend on an external synchronization source such as the text-input rate of an operator transcribing the recorded speech. In this case, input text is time marked and parsed into phonemes. This gives the typed phonetic rate. This rate is averaged like the spoken phonetic rate. This rate can then be used as the target rate input to the Speech-Playback Rate Adjustment Unit 43. With this approach, there should be a mechanism to flag certain typed words that do not directly correspond to uttered speech, for example, speaker identifications, scene descriptions or typographical corrections.

Speech-Playback Rate Adjustment Unit 43

The Speech-Playback Rate Adjustment Unit 43 plays back recorded speech at a rate based on the values provided by the Speech Rate Calculation Unit 41 and the Target Rate Calculation Unit 45. If the calculated speech rate is greater than the target rate, the speech-playback rate is decreased. If the calculated speech rate is less than the target rate, the playback rate is increased.

There are many ways to determine the amount of change in the playback rate. One possible method is to increase or decrease the playback rate by a fixed, small increment every time there is a mismatch in the two rates. This method produces a slow, gradual change in the speech rate. In the other extreme, the rate can be changed so that it matches the target rate instantaneously. This will likely cause abrupt changes in the speech rate. The system can reduce the severity of the rate change by scaling the difference in rates by a constant value less than one. Yet another way is to change the rate based on a non-linear function of the difference in rates, wherein larger differences will cause a disproportionally large change in the rate. For example, the rate can be changed only if the difference exceeds a certain threshold.

Once the desired change in rate is known, there are numerous ways to alter the playback rate of speech. The simplest method, direct change of the playback rate (e.g., playing back an analog tape at a faster or slower speed or playing back digitized speech at a different rate than the original sampling rate), will change the pitch of the voice. Several time-domain, interval-sampling, techniques enable a change in speech-playback-rate without a change in pitch ("The intelligibility of interrupted speech" by G. A. Miller and J. C. R. Licklider in *Journal of the Acoustic Society of America*, 22(2): 167–173, 1950; "Note on pitch-synchronous processing of speech" by E. E. David and H. S. McDonald in *Journal of the Acoustic Society of America*, 28(7): 1261–1266, 1965; "Speech compression by computer" by S. U. H. Quereshi in *Time-Compressed Speech*, pp. 618–623, S. Duker, ed., Scarecrow, 1974; "Simple pitch-dependent algorithm for high quality speech rate changing" by E. P. Neuberg, *Journal of the Acoustic Society of America*, 63(2):624–625, 1978; "High quality time-scale modification for speech" by S. Roucos and A. M. Wilgus, *Proceedings of the International Conference on Acoustics, Speech, and Signal Processing*, pp. 493–496, IEEE, 1985; and "Real-time time-scale modification of speech via the synchronized overlap-add algorithm" by D. J. Hejna, Jr., Master's thesis, Massachusetts Institute of Technology, February 1990, Department of Electrical Engineering and Computer Science.) These techniques are generally low in complexity (real-time software implementations are possible), but some of the simpler methods will result in audible artifacts which may hurt intelligibility. Several frequency-domain methods also enable a change in playback rate without a change in pitch("Time-domain algorithms for harmonic bandwidth reduction and time scaling of speech signals" by D. Malah, *IEEE Transactions on Acoustics, Speech, and Signal Processing*, ASSP-27(2):121–133, April 1979; "Time-scale modification of speech based on short-time Fourier analysis" by M. R. Portnoff, *IEEE Transactions on Acoustics, Speech, and Signal Processing*, ASSP-29(3):374–390, June 1981; and "The phase vocoder: A tutorial" by M. Dolson, *Computer Music Journal*, 10(4):14–27, 1986). These methods are generally more complex than the time-domain techniques, but result in higher quality speech. Another indirect way of altering the overall playback rate is to abbreviate or extend the length of pauses in the speech based on silence detection("TASI quality—Effect of Speech Detectors and Interpolators" by H. Miedema and M. G. Schachtman, in *The Bell System Technical Journal*, pp. 1455–1473, 1962). This approach has the advantages of low complexity and possibly more natural sounding rate-adjusted speech by keeping the uttered speech rate consistent with the original recording.

The method described here is not limited to transcriptions of recorded speech. Since the phoneme recognition can be implemented in a streaming manner, transcription can be done on-line with only a slight delay from 'live'. The system could keep up with rate of slowed-down speech by shortening non-speech segments, and buffering data up-front. Today, on-line transcribers start to transcribe broadcasts in advance by looking ahead during commercials.

This method is useful and efficient for the following reasons:
1. Once embedded in a transcription system, the method relieves the user of having to manually control the playback rate whenever he encounters a change in the transcription load.
2. The system adjusts the speech rate based on acoustic information, and is independent of who is speaking, the rate at which he speaks, and ultimately the spoken language. The system makes the playback of fast and slow talkers more uniform.
3. When the target rate is calculated based on the typing rate, the system automatically adjusts the speech rate to match the typing rate of the transcriber, without requiring his intervention.
4. The target rate can be selected based on a more intuitive value, such as words per minute.
5. The speech rate adjusted to the calculated or pre-defined rate is intelligible.

APPENDIX II

Time-Event Tracker Method and System

The disclosed is a method and system to automatically link user input with a playback or recording of streaming data through time-correlated, event-generated data pointers. The disclosed can be used to link meeting minutes with an audio recording of the meeting. A closed captioning system could also use this method to get a rough alignment between the transcript and the audio or video recording.

Abstract

The disclosed is a method and system to automatically link user input with a pre-recorded playback or live recording of streaming data via time-stamped event pointers. The system automatically detects pre-defined trigger events, pairs an event label with a pointer to the data that caused the event, then time stamps and records the data in a master file. User input is thus linked to the streaming data by the nearest-in-time trigger event recorded for the streaming data.

Purpose

The disclosed is a method and system to automatically link user input with a playback or recording of streaming data through time-correlated, event-generated data pointers. There are many practical applications of such a system:
  The disclosed links meeting minutes with an audio recording of the meeting.
  The closed captioning system discussed above uses this method to get a rough alignment between the transcript and the audio or video recording.
  The disclosed could be incorporated in a video annotation system.

Background Matter

Finding a desired section within a recording of streaming data (e.g., an audio or video tape recording) is typically difficult even for the person who made the recording. Without some additional information, it is impossible for someone who has never witnessed the recorded data to find a desired section short of playing back the data from the start. Often it is desirable to correlate the contents of an audio or video recording with additional user data, such as notes or annotations. For example, an audio or video recording of a presentation could be correlated with a set of notes taken during the course of the talk.

Systems for event logging provide a basic correlation capability. The UNIX utility syslogd provides a facility for time-stamped logging of user-defined events. Events generated by multiple sources are logged into a central file along with their time-stamps. Events can be correlated by comparing time-stamp values. Similarly, in an X windows system, user events can be logged along with their time stamps as a record of the user's activities.

There is a variety of prior art describing event logging systems and their applications. The patent "Arrangement for Recording and Indexing Information" (U.S. Pat. No. 4,841,387 to Rindfuss) addresses the specific problem of correlating hand-written notes to a reel-type audio recording. The invention is a device that automatically correlates the position of the hand-written notes on a page with the position of the audio tape on the reel. The patent "Interactive System for Producing, Storing and Retrieving Information Correlated with a Recording of an Event" (U.S. Pat. No. 5,564,005 to Weber et al.) is a more general approach to linking information with a recording. However, that system forces the user to explicitly request a "time zone" event in order to correlate subsequent user input to a given section of recorded data. The patent "Method and Apparatus for Recording and Analyzing an Interaction Log" (U.S. Pat. No. 5,793,948 to Asahi et al.) describes a system with an event detecting means that triggers a state detecting means wherein the state detecting means detects at least two parameters, position and time, of objects within a display window. These parameters are recorded and linked with the triggering event, but not with another synchronous data stream. The patent "Computer Graphics Data Recording and Playback System with a VCR-based Graphic User Interface (U.S. Pat. No. 5,748,499 to Trueblood) is limited to recording of an X-windows session wherein X-windows commands, states, and events are linked via time-stamps. Similarly, the patent "Computerized Court Reporting System" (U.S. Pat. No. 4,924,387 to Jeppesen) is limited to synchronizing stenographic annotations with a video recording of a trial.

Event logging methods assume that a data-pair consisting of an event label and a time-stamp is sufficient to determine the relationship between time sequences of actions. This is often the case for computer system events or X window events. However, this approach is problematic for streaming media data. An event logging approach is possible if one assumes that streaming data is produced or recorded at a known rate. Given the data rate and a particular time stamp it is possible to determine a position within the data stream. However, in many important applications the streaming rate can vary asynchronously, as when a media source such as a tape player is paused, reversed, or advanced frame-by-frame using a thumbwheel.

An alternative to correlating time-stamped events with a continuous data stream is to break a data stream up into chunks, each associated with a particular event. An example of this approach is the "record narration" feature of Microsoft Powerpoint97. Each slide in a presentation can be linked to a separate audio file which will be played whenever that slide is rendered.

In cases where a multimedia data stream contains an audio channel, speech technology can be used to correlate the data stream with a text transcript. By performing speech recognition on the audio channel it may be possible to correlate words in a transcript with positions in the data stream. However, this approach is limited to data streams with speech audio on which speech analysis is successful.

The How's

Figure 5:
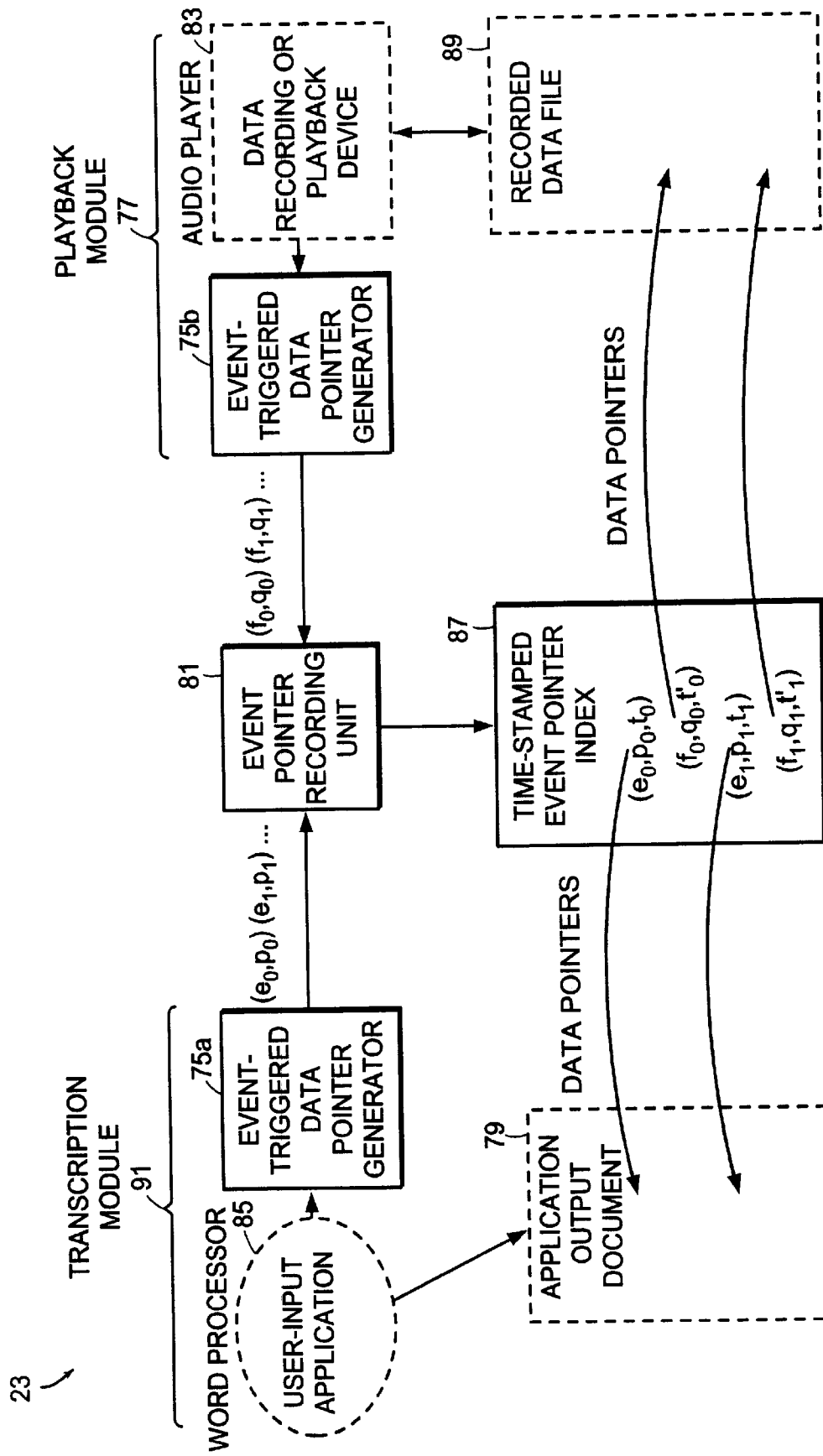
FIG. 5 is a block diagram of a time event tracker of the embodiment of FIG. 1.

The disclosed is a time event tracker system 23 for automatically correlating one or more unsynchronized streams of data by means of predefined, time-stamped events with associated data pointers. FIG. 5 shows a block diagram of the system 23. The system 23 consists of a plurality of Event-Triggered Data Pointer Generators 75a and 75b and an Event Pointer Recording Unit 81. Each generator unit 75 is designed to detect a set of user-defined events and communicate the occurrence of each event along with an associated data pointer. Each generator 75 produces a sequence of pairs of the form ($E_i$, $P_i$) where $E_i$ is an event label, $P_i$ is a data pointer and i denotes the position in the sequence.

The dotted lines in FIG. 5 illustrate the use of the system 23 for on-line audio transcription. In this application, a user listens to an audio signal (from 83) and transcribes it into text 79 in real time. The user has a means to slow down or speed up the rate of audio playback as needed to aid in transcription. This is described in Appendix I. Note that the playback device 83 could be an external analog tape deck which is physically distinct from the computer system on which the transcription is being entered. There are two generator units 75a and 75b. They take their inputs from the word processing software 85 on which the transcription is entered and from the external tape deck 83 (through an appropriate hardware interface).

The trigger events for transcription 91, labeled $e_i$ in FIG. 5, are generated whenever the user types a new word in the word processing application 85. There are three types of transcription trigger events, called "append", "insert" and "delete". "Append" events are generated whenever a word is added to the end of the current transcript. "Insert" and "delete" events are generated whenever the user backs up inside previously typed text and inserts or deletes a word. The associated data pointers, labeled $p_1$ in FIG. 5, give the absolute position of each word within the document 79. In the preferred embodiment, this is a word identifier which is incremented in units of 100 to accommodate insertions and deletions. A typical sequence of event-pointer pairs on the transcription side 91 might be: (append, 300), (append, 400), (insert, 350), (append, 500), etc. The transcript-side data pointer generator 75a unit can easily produce word identifiers for append events by incrementing the most recent identifier by 100. Identifiers for insert events can be produced by computing the average of the identifiers for the two words which border the insertion.

The playback-side pointer generator 75b takes its input from the analog tape deck 83. Playback trigger events, labeled $f_1$ in FIG. 5, are produced whenever there is a change in the playback rate of the audio data. In a simple instantiation, there would be five trigger events fn corresponding to the functions play, stop, fast-forward, rewind and pause. The data pointers are labeled $q_1$ in FIG. 5. They identify the absolute position in the audio source, called the audio position, at which a trigger event occurred. In a simple instantiation, a pointer could be a burned-in time-code on the tape which is read by a high-end deck such as a Betacam. A typical sequence of event-pointer pairs on the playback-side 77 might be: (play, $T_0$), (rewind, $T_1$), (play, $T_2$), (fast-forward, $T_3$), etc. where the $T_1$'s are time-codes.

The Event Pointer Recording Unit 81 assigns a universal time-stamp to each event-pointer pair, resulting in a triple of the form ($E_i,P_i,t_i$) where $t_i$ denotes the time-stamp for the ith triple. The triples are recorded in the Time-stamped Event Pointer Index 87, where they can be ordered on the basis of their time-stamp value. In the example shown in FIG. 5, two sequences of triples of the form ($e_0,p_0,t_0$), ($e_1,p_1,t_1$), . . . and ($f_0,q_0,t'_0$), ($f_1,q_1,t'_{t1}$), . . . are logged in the index. In this example, it is assumed that each time-stamp $t'_i$ is matched to time-stamp $t_i$. If each stream of event pairs is recorded separately, the matching process may be accomplished with a simple merge sort. The time-stamp matching process serves to correlate the unsynchronized data streams represented by the sequences of pointers $p_i$ and $q_i$. In the transcription application, words in the transcript 79 are matched to positions on the audio tape 89.

An important point is that in many applications such as transcription, preprocessing of the index is necessary before the time-stamp matching process can be performed. There are two categories of preprocessing: event filtering and data pointer interpolation. Event filtering is necessary whenever insertions or deletions are being made into a data stream.

This occurs in the transcription module side 91 of FIG. 5, since words are inserted and deleted into the transcript 79 in real-time as the user corrects mistakes or omissions. Deletion events are filtered by matching their data pointer to the data pointer of a previous append event, and then removing both events from the index 87. Likewise, the data pointers associated with insertion events are assigned a time-stamp which is consistent with their position in the stream. This is done by changing the time-stamp for insertion events to the average of the time-stamp values for the data pointers that border the insertion. As an example consider the following sequences of triples produced by the Event Pointer Recording Unit 81 from the output of the transcript-side data pointer generator 75a and stored in the index 87: (append, 500, 20), (append, 600, 25), (append, 700,35), (delete, 500, 40), (insert, 650, 50). After filtering, this sequence becomes: (append, 600, 25), (insert, 650, 30), (append, 700, 35).

The second preprocessing operation is data pointer interpolation. This is performed in order to generate a regular stream of data pointers from a sparse set of trigger events. This is necessary in the playback module/side 77 of the transcription system, since the goal is to correlate the transcript 79 with the audio stream 89 at a much finer temporal scale than that of the tape deck trigger events. Each event such as play or fast-forward changes the playback speed of the tape. Thus this speed is known between events. Given the time-stamps for two events, the elapsed time that separates them can be divided into regular intervals and assigned additional time-stamps. Given the data pointers at the event occurrence and the playback speed, it is simple to interpolate the pointer values at the boundary across the time intervals. The result is a dense set of data pointers at regular intervals. The size of the sampling intervals are chosen depending on the desired resolution in correlating the text 79 to the audio 89.

Data pointers are necessary in dealing with a data stream, such as words in a transcript, that is not contiguous with real-time. The presence of insertions and deletions removes any simple correlation between stream position and real-time. Correlation can be restored through post-hoc analysis using the stored data pointers.

Data pointers are also useful in providing robustness to system latency. This can be illustrated using the example of audio transcription. Suppose the task is to correlate user input with an audio stream. The Event-Triggered Data Pointer Generator 75b for the audio playback device 83 produces a sequence of pairs consisting of a playback event label (play, fast forward, rewind, stop, pause) and its associated data pointer (e.g. the audio position). These data provide a complete record to the point in the audio signal where the event occurred. Latency at the Event Pointer Recording Unit 81 will only affect the accuracy of the temporal correlation between the user input events and the audio playback events. It will not affect the positional accuracy of the data pointer. In contrast, an event logging system would simply time-stamp the event labels. In these systems, audio positions must be deduced from the time-stamp and the audio playback rate associated with each event. Thus any difference between the recorded time-stamp and the actual time at which an event occurred will produce errors in the audio position. These errors will be further compounded by latencies in logging user events.

The ordered index 87 that results from time-stamp matching serves to cross-link multiple data streams, permitting several different kinds of access. For example, given a desired time, the closest time-stamp for each data stream can be identified. Using the associated data pointers, the corresponding data stream positions associated with that time can be identified. In the above example, suppose that $t_1$ and $t'_1$, were the closest time stamp matches to a given query time t. Then the pointers $p_1$ and $q_1$ would give the data stream positions associated with time t.

Alternatively, given a position in a particular data stream, the closest data pointer stored in the index can be identified. The time-stamp for that entry can then be compared to the time-stamps for the other data streams, resulting in a set of corresponding entries in the index. The data pointers for these entries can be followed, given the corresponding positions in the other data streams. For example, suppose that $p_0$ was the closest data pointer to a given query position. Then since $t_0$ is matched to $t'_0$ (after appropriate event filtering and data pointer interpolation), it follows that $q_0$ is the position in the second data stream that corresponds to the query position. This could be used in the transcription example to synchronize the display of the transcript 79 with the playback of the audio 89. It could also be used for multimedia indexing. In that case, text queries would produce matches in the transcript text 79 which could then be linked directly to segments of audio 89 content.

Furthermore the recorded content can be modified in a post-processing phase to incorporate the cross-links produced by time-stamp matching. In the transcription system, for example, words in the transcript 79 could be automatically hyperlinked to spoken words in the recorded data 89, using the capability for indexing into a data stream provided by formats like RealAudio. Or frames in a video sequence could be automatically labeled with text from a correlated transcript.

Figure 6:
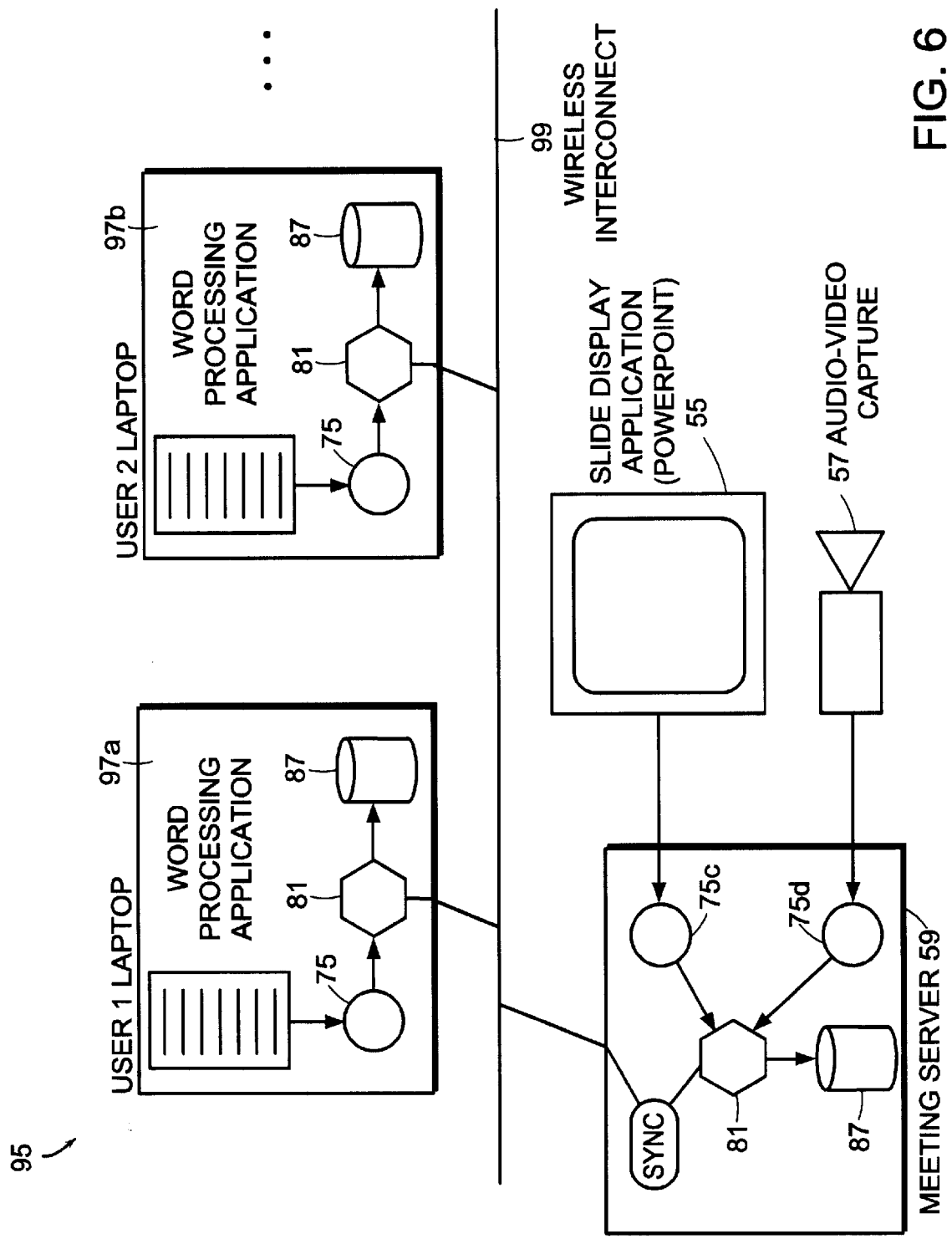
FIG. 6 is a schematic view of an alternative use of the time event tracker module of FIG. 5.

It should be clear that the time-event tracking system 23 could be adapted to many different scenarios. For example, by changing the time interval used in pointer interpolation one can address both closed captioning applications where many words map to a single video frame, and transcription applications where words map to audio samples at a much finer level of granularity. FIG. 6 shows the architecture for a presentation-recording system 95, which is a second application that is enabled by the disclosed time-event tracker module of FIG. 5. In the presentation recording system 95, a multiplicity of users watching a presentation take notes using an application such as a word processor. In a preferred embodiment, each note-taker is using a portable computer 97a, b, such as a laptop, with a wireless network connection 99. Each portable 97 is running a subset of the architecture in FIG. 5, consisting of a data pointer generator 75 for the word processor and a recording unit 81. In this case, each recording unit is only logging one stream of event-pointers. All of the recording units 81 are synchronized via the wireless network 99 so their time-stamps will be consistent. Here text events might be generated at the level of paragraphs or sentences rather than words as in the transcription example. Note that the issue of handling insertions and deletions remains.

The presentation system 95 includes a second instantiation of the architecture from FIG. 5, which runs on a meeting server 59. It has two generator modules 75c, d, which service a slide presentation application 55, such as MS PowerPoint, and an audio-visual capture device 57. The event triggers for the PowerPoint application 55 would be either a slide change or a within-slide animation. The data pointers are the slide number or an identifier for the within-slide animation. The presentation system 95 makes it possible to correlate notes against the particular slide or animation displayed by the presenter. Note that out-of-order access to slides is also present in this application, analogous to out-of-order generation of text entries in the note-taking module.

Events for the audio-video capture device 57 could be very simple, possibly just indicating the beginning and end of the presentation. Implicitly generated events and data pointers would provide pointers into the recorded stream at regular, pre-defined intervals. The recording unit 81 for the meeting server 59 is synchronized with the individual recording units 81 on each user's portable computer 97, to ensure consistent time-stamps.

After the talk is over, each user would have the option of correlating their notes against both the audio-visual recording and the time-stamped pointers into the presentation slides. This could be done via a simple web interface. It could be performed by doing a merge sort between the user's event-pointer index 87 and the one produced on the meeting server 59. The same web interface could then allow each user to retrieve a presentation slide and video clip associated with each sentence or paragraph in their notes. In addition, the user could replay the presentation recording, with both the PowerPoint slides 55 and their recorded notes scrolling in synchrony with the audio-visual 57 playback.

In a further embodiment, the notes from all of the users in attendance could be pooled into one larger time-matched index, by simply merge sorting all of the separate index files 87. The result could be easily cross-linked against the presentation slides 55 and audio-video recording 57 as described above. A searchable text index of the pooled notes could then be constructed, using AltaVista search technology, for example. This would allow people who had not attended the talk to search for keywords in the pooled notes. Each hit would have a set of cross-linked data pointers that would make it possible to retrieve the slides and video clips of the presentation associated with the keywords. The retrieval quality of this index could be further improved by augmenting the index with text from the slides 55 themselves, as well as transcripts of the presentation obtained through speech recognition.

Because the system 95 explicitly stores data pointers, one can cross-link data streams which do not share a common clock, or even have a consistent real-time clock. For example, if one stream consists of video or audio data it is not necessary that the other streams be expressible in terms of video frame rate or audio sample rate. Furthermore, the system 95 supports data streams in which the data rate can change dramatically in an asynchronous or unpredictable fashion.

Event-Triggered Data Pointer Generators 75

The Event-Triggered Data Point Generators 75 detect trigger events from, for example, a user input application 85 or a streaming data recording or playback device 83. The trigger events are prespecified and can be explicit or implicit. Explicit trigger events include, for example, an auto-save event in a word processing application 85, or a 'stop', 'play', 'record', or 'pause' command on a streaming data recording/playback device 83.

User input data is often created using a PC application such as a word processor 85. To get more resolution for the user input data, the Event-Triggered Data Pointer Generator 75a (FIG. 5) may incorporate a gateway application to intercept keyboard and mouse inputs before they are passed to the user input application 85. Most operating systems enable a keyboard intercept functionality. For example, the Windows 95 operating system has the VKD_Filter_Keyboard_Input keyboard input service to allow a program to access all keyboard input before it is processed. This approach would allow trigger events to resolve down to the individual keystrokes.

Because of the nature of the streaming data recording/playback devices 83, only the 'play', 'record', 'fast forward', 'rewind', 'pause', and 'stop' events need be explicitly communicated to the Event-Triggered Data Pointer Generators 75b. Given a fixed playback or record data rate, one embodiment of the Event-Triggered Data Pointer Generator 75b could automatically generate data trigger events based on elapsed time, thus, implicit trigger events occur for every predetermined, fixed, interval of time. In this embodiment, the Event-Triggered Data Pointer Generators 75b also must implicitly generate the data pointers, resulting in a possible reduction of accuracy. To improve the resolution of links to the streaming data events, the Event-Triggered Pointer Generators 75b for such data typically will trigger at a much higher rate than the Event-Triggered Data Pointer Generators 75a monitoring the user input application.

Event Pointer Recording Unit 81

The Event Pointer Recording Unit 81 gets data pairs from the Event-Triggered Data Pointer Generators 75, time-stamps each pair, filters the events and interpolates the data pointers as needed, then sorts the events according to chronological order, and records the events that are relevant to the linking between data streams. Events that can be deduced from other recorded events do not have to be recorded.

Linking between user input data events and the streaming data events is implicit and based on proximity in time. This linking has a fairly coarse resolution, within a few seconds, depending on the reaction speed of the user and/or the user input application 85. For the case of speech recording or playback, the time alignment can be further refined through the use of speech recognition as discussed previously. Another way to refine the speech alignment is to back up the user input event index to the beginning of a sentence by detecting pauses in the recorded audio.

Implementation

One embodiment of the time-event tracking system 23 (the architecture) of FIG. 5, is as a software library with associated API that would allow any PC or handheld computer to function as an annotation device. Using the API, the user interfaces to any standard application such as Microsoft Word as well as to video capture cards. The API also defines an interface to search technology such as Alta Vista Personal Edition that would make it easy to search a set of recorded annotations. This configuration may be viewed as extending the utility of standard retrieval technology by providing a means for a user to link searchable attributes to a media stream that would otherwise remain inaccessible to indexing techniques. Using this configuration of time-event tracker system 23, many specialized systems for tasks such as court recording could be replaced by PC systems running a general purpose software library with an off-the-shelf capture card.

For example, one data stream might consist of a series of words typed into a document editor such as Microsoft Word97. These words would comprise a set of notes for a presentation, captured in real-time during the talk. A second data stream might be an audio and video recording of the presentation. Using the system 23 of FIG. 5, it is possible to easily establish the correlation between words in the notes and audio/video samples within the data multimedia stream.

For another example, this system 23 may be used to automatically link user-entered meeting notes with the relevant sections in an audio recording of that meeting. The system 23 may also be used to get a rough alignment between the transcript and the audio or video recording (described above). In education and surveillance applications, a user may attach their own searchable annotations to course materials and captured footage. Many of these applications can gain considerable leverage from the ability to rapidly search the user input which has been associated with a media stream using standard indexing and retrieval technology.

The Why's

The disclosed time-event tracking system 23 links time-correlated data pointers generated by trigger events, instead of merely a description or identification of the trigger events. This approach accommodates the asynchronous nature of some media sources. It allows an arbitrary playback speed with a possibly non-streaming, non-continuous presentation clock. For example, in the closed captioning system 11 (FIG. 1) disclosed above, the audio playback rate could be sped up or slowed down to match the transcriber's typing rate. The audio playback device can also be paused, rewound or fast forwarded during the transcription process. Because the Event-Triggered Data pointer Generator 75b provides a direct pointer (e.g., the tape counter or a recorded time stamp as opposed to an event time stamp) to the data being played during a trigger event, the transcription text 79 is linked to the appropriate audio 89. Another part of the system 11 then fine tunes the audio link to match the typed words with the spoken words as discussed previously. Because data linking is based on a recorded clock instead of a presentation clock, the audio clock does not necessarily have to be the master clock of the system 11, unlike most other systems.

This approach also enables the synchronization of user input to media playback/recording devices that are not tightly integrated into a unified system. It is well suited to systems that have little or no control of an external, asynchronous media stream. The Event Pointer Recording Unit 81 only needs trigger event notifications from an external source in a timely fashion. The notifications must include a pointer to the appropriate point in the data when the trigger event occurred. For example, an external videotape player would have to provide its tape counter whenever a trigger event (any VCR command) occurred.

This approach makes order of creation of data streams unimportant. For example, when used in a text transcription system, the system 25 allows a user to create a transcript before, during or after an audio recording. If a transcript is created before an audio recording, there must be a mechanism (e.g., user input) to generate trigger events to the text during the subsequent recording.

Once the trigger events are defined, they are automatically detected and linked without user intervention.

The disclosed system 23 is useful and efficient for the following reasons:

1. The system 23 is mostly independent of the user input application. No modification to the application is required to provide for the generation of observable trigger events.
2. The trigger-event detection scheme is very general and adaptable. For example, if a word processing program is used for user input, the auto-save or auto-recovery mode could be set for the most frequent updates. The trigger event can then be the auto-save action. Higher resolution is possible with the use of a keyboard/mouse gateway application.
3. The linking operation is automatic. Once the trigger events are defined, operation of the time-event tracking system 23 is transparent to the user.

What is claimed is:

1. A method for controlling rate of playback of audio data corresponding to a stream of speech, comprising the computer implemented steps of:
   using speech recognition, calculating rate of speech in the stream of speech;
   receiving the calculated rate of speech at a playback rate adjustment unit;
   using the playback rate adjustment unit, determining difference between the calculated rate of speech and a target playback rate; and
   based on said determining adjusting rate at which the audio data is played back to match the target playback rate.

2. A method as claimed in claim 1 wherein said step of using speech recognition includes:
   determining a sequence of linguistic units indicative of the stream of speech; and
   for each determined linguistic unit in the sequence, determining time of occurrence of the linguistic unit in the stream of speech.

3. A method as claimed in claim 2 wherein the step of calculating rate of speech includes computing linguistic unit rate.

4. A method as claimed in claim 1 wherein the step of determining difference includes determining if the calculated rate of speech is greater than the target playback rate; and
   the adjusting step decreases the rate of playback of the audio data.

5. A method as claimed in claim 1 wherein the step of determining difference includes determining if the calculated rate of speech is less than the target playback rate; and
   the adjusting step increases the rate of playback of the audio data.

6. A method as claimed in claim 1 wherein the step of determining uses a predefined value as the target playback rate.

7. A method as claimed in claim 1 wherein the step of determining uses a value indicative of transcription rate by a transcriber of the audio data, as the target playback rate.

8. A method as claimed in claim 1 wherein the step of adjusting includes altering the rate of playback of the audio data in a manner free of changing pitch of the corresponding speech.

9. A method as claimed in claim 8 wherein the step of altering employs a frequency domain technique.

10. A method as claimed in claim 8 wherein the step of altering employs a time domain technique.

11. A method as claimed in claim 10 wherein the time domain technique includes interval sampling.

12. A method as claimed in claim 10 wherein the time domain technique includes silence removal.

13. Apparatus for controlling rate of playback of audio-data corresponding to a stream of speech, comprising
   a calculation unit for calculating rate of speech in the stream of speech using speech recognition; and
   a playback rate adjustment unit coupled to receive from the calculation unit the calculated rate of speech, the playback rate adjustment unit determining difference between the calculated rate of speech and a target playback rate, and based on said determined difference, the playback rate adjustment unit, adjusting rate at which the audio data is played back to match the target playback rate.

14. Apparatus as claimed in claim 13 wherein said calculation unit uses speech recognition to determine a sequence of linguistic units indicative of the stream of speech, and for each determined linguistic unit in the sequence, determines time of occurrence of the linguistic unit in the stream of speech.

15. Apparatus as claimed in claim 14 wherein the calculation unit computes linguistic unit rate.

16. Apparatus as claimed in claim 13 wherein the playback rate adjustment unit determines if the calculated rate of speech is greater than the target playback rate and, if so, decreases the rate of playback of the audio data.

17. Apparatus as claimed in claim 13 wherein the playback rate adjustment unit determines if the calculated rate of speech is less than the target playback rate and if so, increases the rate of playback of the audio data.

18. Apparatus as claimed in claim 13 wherein the playback rate adjustment unit uses a predefined value as the target rate.

19. Apparatus as claimed in claim 13 wherein the playback rate adjustment unit uses a value indicative of transcription rate by a transcriber of the audio data playback, as the target rate.

20. Apparatus as claimed in claim 13 wherein the playback rate adjustment unit alters the rate of playback of the audio data in a manner free of changing pitch of the corresponding speech.

21. Apparatus as claimed in claim 20 wherein the playback rate adjustment unit employs a time domain technique.

22. Apparatus as claimed in claim 20 wherein the playback rate adjustment unit employs a frequency domain technique.

23. Apparatus as claimed in claim 22 wherein the time domain technique includes interval sampling.

24. Apparatus as claimed in claim 22 wherein the time domain technique includes silence removal.

* * * * *